Figure 2A:
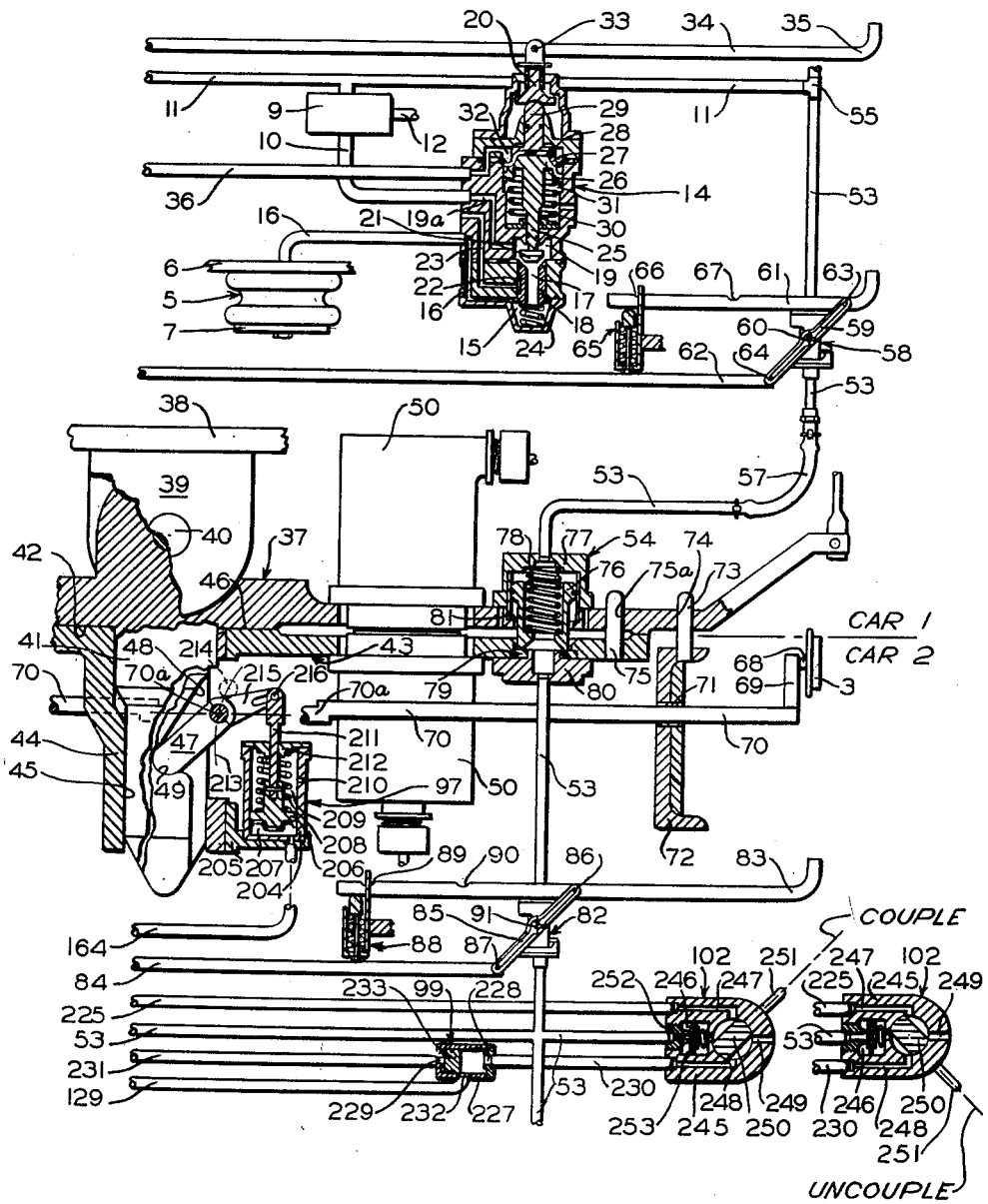

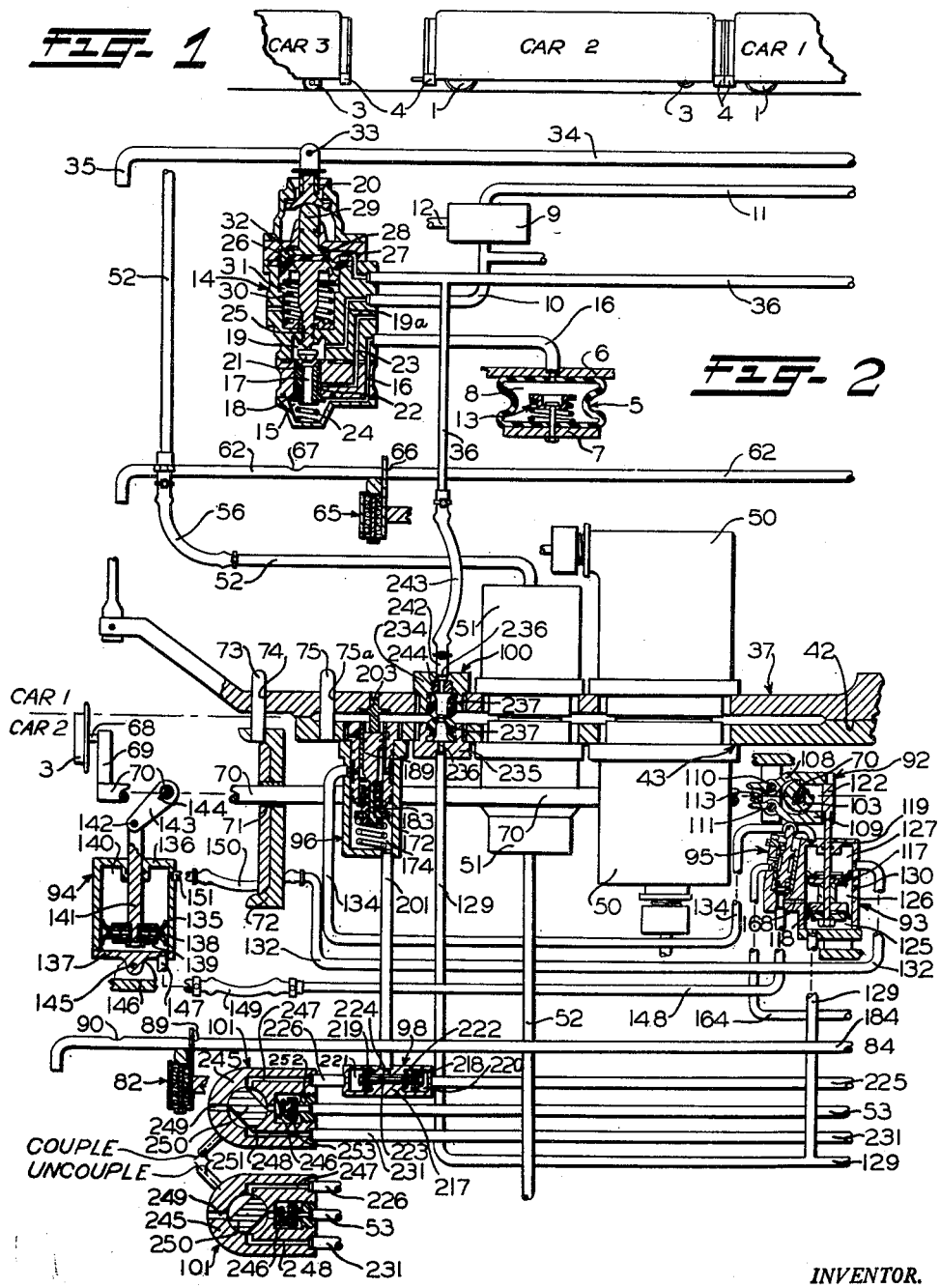

Dec. 11, 1962 M. B. CAMERON 3,067,883
AUTOMATIC COUPLER FOR RAILWAY CARS
Filed Feb. 25, 1957 3 Sheets-Sheet 2

INVENTOR.
Mortimer B. Cameron
BY
Adelbert A. Steinmiller
ATTORNEY

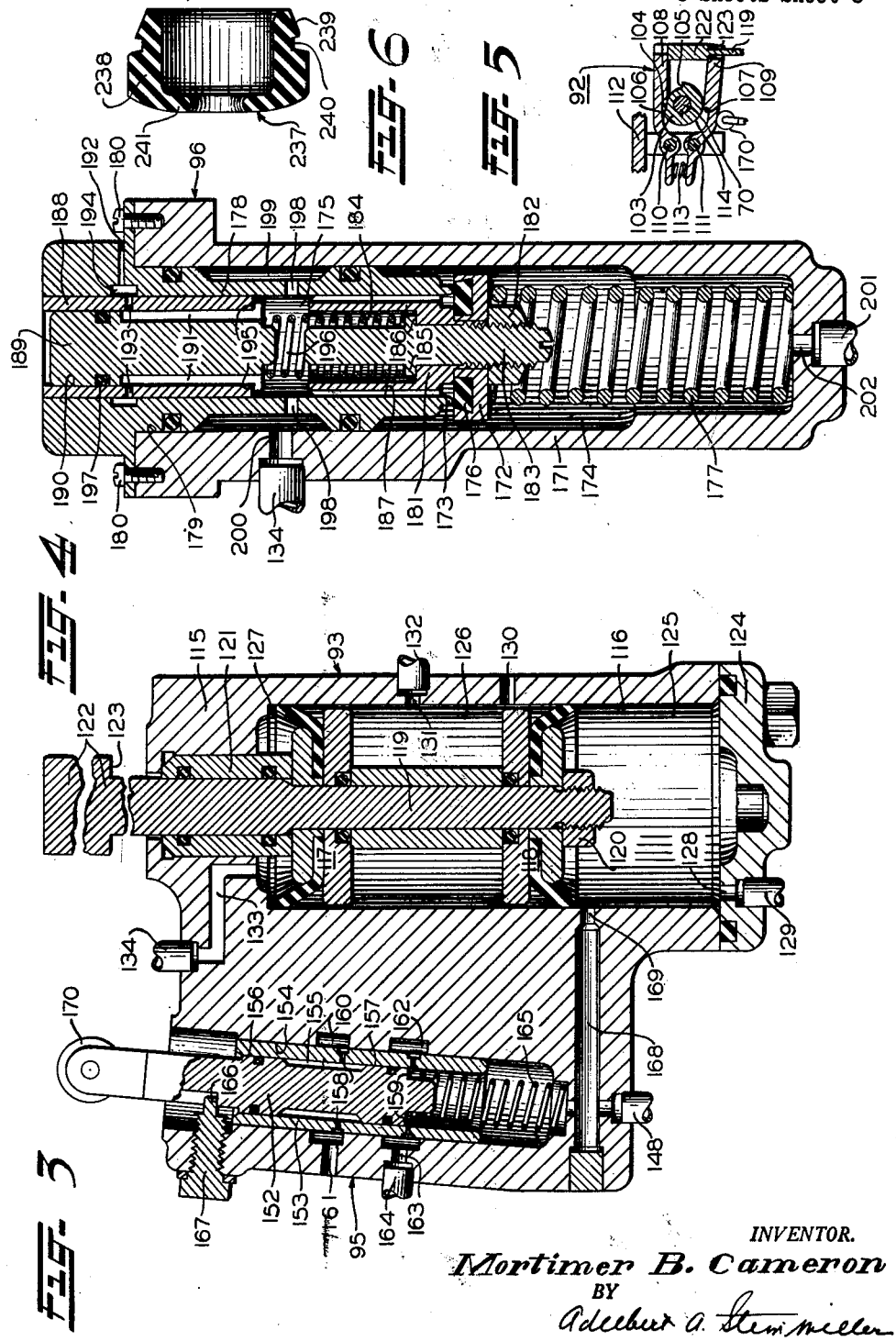

United States Patent Office 3,067,883
Patented Dec. 11, 1962

3,067,883
AUTOMATIC COUPLER FOR RAILWAY CARS
Mortimer B. Cameron, Pittsburgh, Pa., assignor to Westinghouse Air Brake Company, Wilmerding, Pa., a corporation of Pennsylvania
Filed Feb. 25, 1957, Ser. No. 642,166
22 Claims. (Cl. 213—212)

This invention relates to automatic coupler apparatus and more particularly to such apparatus for multi-unit articulated vehicles in which an axled end of one vehicle unit supports via a coupler a non-axled end of a second vehicle unit having retractable dolly wheels capable of being lowered for independent support of such non-axled end when the two vehicle units are separated.

In such multi-unit articulated vehicles, it is desirable that lowering and raising of the dolly wheels on the second vehicle unit and coupling and uncoupling of the two vehicle units may be effected simply and without employment of undue physical exertion, and accordingly the present invention provides a fluid pressure operated apparatus under control of operator's control valve means to effect such uncoupling.

It is also desirable that the dolly wheels on the second vehicle unit occupy their fully lowered positions prior to separation of the two vehicle units in order to avoid mishap to such second vehicle unit, and accordingly the present invention comprises interlock means which assures that the dolly wheels on the second vehicle unit are fully lowered prior to unlocking the coupler members securing together the two vehicle units.

Since the dolly wheels are locked in their retracted position, the present invention further provides interlock means for assuring that the dolly wheels are unlocked before power-effort is exerted to lower them.

In certain types of vehicle units, such as certain railway cars employed in passenger trains of the "Train X" type, for example, the dolly wheels at the non-axled end of such units may be actuated to their raised and lowered positions through the medium of a rotatable shaft common to each, and accordingly certain features of the present invention relate to the use of such a rotatable shaft in conjunction with operating and interlock features as previously set forth.

In a multi-unit articulated vehicle of the "Train X" type referred to above, the body of the axled end of the one car is normally supported on air springs which when depressurized results in lowering of such axled end of the body of the one car into support by caged mechanical springs. Further, such axled end of the body of the one car includes a male coupler member in the form of a coupling pin extending horizontally therefrom for insertion in a female coupler member in the form of a coupling socket provided at the complementary dollywheel end of the second car for the support-transmitting coupling between the two cars. The dolly-wheel mechanism is so designed that the dolly wheels, while in their lowered position support the end of the car at a height in which the axis of the coupling socket lies below the axis of the coupling pin on the other car with its air springs pressurized, and so that the two axes will be in proper vertical alignment for coupling and uncoupling only when the aforesaid air springs are depressurized. Proper mating engagement of the two coupler members and coupling of the cars is thus assured in the event that the air springs should accidentally become depressurized as a result of leakage of fluid under pressure therefrom, for example. According to the present invention, a novel arrangement is provided whereby the air springs on the axled end of the one car may be depressurized intentionally during coupling for the purpose of lowering the coupling pin thereon into proper vertical alignment with the coupling socket on the other car to assure successful coupling of the two cars. With this arrangement intentional depressurization of the air springs may also be accomplished prior to uncoupling of the cars.

Still further, in the multi-unit articulated vehicle of the aforesaid "rain X" type, while the axled end of the body of the one car is coupled for support of the non-axled end of the second car and the dolly wheels thereon are in their lowered positon, depressurization of the air springs on the one car results in bringing the lowered dolly wheels into closer proximity of the rails and thereby reduces to a minimum amount the vertical distance which the end of the respective car must drop for the dolly wheels to contact the rails and thus support the car independently of the coupler upon separation from the other car. Shock to such dolly wheels and associated structure may thus be greatly reduced. Accordingly, the present invention provides means, operable during uncoupling of the cars, for effecting depressurization of the air springs on the axled end of the one car automatically in conjunction with the lowering of the dolly wheels and unlocking of the coupler on the non-axled end of the other car.

Other features and advantages of the invention will become apparent from the following more detailed description of such invention when taken in connection with the accompanying drawings in which:

FIG. 1 is a simplified diagrammatic view in elevation of railway cars representing vehicle units of the type hereinbefore identified, showing the manner in which such cars may be coupled together for complementary support to form an articulated grouping in a train, as well as the manner in which a particular car is supported on dolly wheels at its axleless end when uncoupled and separated from a complementary car;

FIG. 2 taken in conjunction with FIG. 2a is a diagrammatic view, partly in outline and partly in section, of an automatic combined train pipe, train wire, and car coupler apparatus embodying the invention as employed on complementary ends of adjacent railway cars of the identified type; and FIGS. 3, 4, 5 and 6 are views, on enlarged scale and in cross-section, of details of certain components, hereinafter identified, of the coupler apparatus illustrated in FIGS. 2 and 2a.

DESCRIPTION

Referring to FIG. 1, for sake of illustration, railway cars of the type hereinbefore identified have an axled end with wheels 1 for constant engagement with the rails, as shown on cars labeled "Car 1" and "Car 2" for support of such axled end. The axleless end of each of "Car 2" and "Car 3" is provided with retractable dolly wheels 3 which are normally retracted, as shown wtih respect to "Car 2," when such axleless end is supported through the medium of the car coupler 4 by the axled end of an adjacent car, such as "Car 1" as shown in the drawing. When a car is separated or uncoupled, the dolly wheels 3 are caused to assume a lowered position for engagement with the rails as shown with respect to the "Car 3" for independent support of the axleless end of such car.

Referring to FIGS. 2 and 2a, on the axled end of "Car 1" are air springs 5, two, for example, one adjacent each side, which are interposed vertically between respective body member 6 and axle-supported members 7 and the interior chambers 8 of which are adapted to be pressurized under the control of respective leveling valve devices 9 to maintain the car body at a preselected height above the axle during use of the railway car in a train irrespective of the load on such car. The leveling valve devices 9, for sake of illustration, may be of the type disclosed in the copending United States patent application of Harry C. May and Joseph F. Frola, Serial No. 568,113, filed February 27, 1956, now Patent No. 2,945,690, and assigned to the assignee of the present invention. This leveling valve device is mounted on the car body or member thereof and is operated by means (not shown) to so control connection of an air spring delivery pipe 10 to a supply pipe 11 or to a respective vent pipe 12 as to regulate the degree of pressurization in the respective chamber 8 in the respective air spring 5 to maintain the substantially constant degree of vertical separation between the body member 6 and the axle-supported, unsprung member 7.

Each of the air spring devices 5 comprises a caged spring assemblage 13 disposed within the chamber 8 thereof for resilient support of the car body upon lowering of the respective body member 6 into engagement therewith when such chamber 8 becomes devoid of fluid under pressure.

According to a feature of the invention, a means is provided whereby fluid pressure communication between the leveling valve devices 9 and the air springs 5 respective thereto may be disestablished and the interior chamber 8 of such air spring may be vented to the atmosphere to intentionally effect lowering of the car body into support by the caged spring assemblages 13 associated with such air springs. Such means preferably may take the form in which it is shown in the drawings wherein two manually operated valve devices 14 are provided, one for each air spring.

Each of the valve devices 14 has a delivery chamber 15 which is constantly connected by way of conduit means 16 to the interior chamber 8 of the respective air spring 5 and such chamber 15 is normally open to the respective delivery pipe 10 from the leveling valve device 9 by way of a central passage 17, in a combined supply valve seat and exhaust valve element 18, a supply chamber 19 and a passage 19a.

In each valve device 14, by rockable movement of a lever assemblage 20, a supply valve 21 may be actuated into engagement with element 18 to close the central passage 17 and displace said element 18 for exposure of a longitudinal slot 22, formed in the outer periphery of said element 18, to the delivery chamber 15 for establishing communication thereof with an atmospheric vent passage 23 to permit release of fluid under pressure from the respective air spring chamber 8 by way of conduit means 16 and said delivery chamber 15. A light bias spring 24 disposed into the delivery chamber 15 is arranged to oppose such displacement of the element 18 and to return such element to its seated position in which it is shown in the drawing upon unseating of supply valve 21.

Operative connection between the lever assemblage 20 and the supply valve 21 includes an axially slidable stem 25 attached at one end to said supply valve, a diaphragm follower member 26 attached to the opposite end of said stem 25, a diaphragm 27, a second diaphragm follower member 28, and a stem 29 attached at its one end to said follower member 28 and at its opposite end contacting a portion of said lever assemblage 20.

A return spring 30 disposed in a non-pressure chamber 31 at one side of the follower member 26 is arranged to urge such follower member and attached stem 25 in the direction of a control chamber 32 toward a repose position defined by engagement of the follower member 28 with the casing of the valve device and in which position the supply valve 21 is unseated from element 18.

To enable simultaneous rocking movement of the lever assemblages 20 of the two valve devices 14 for seating of their respective supply valves 21 and unseating of their respective exhaust valve elements 18 to vent the interior chambers 8 of the respective air springs 5 to the atmosphere, such lever assemblages 20 are pin-connected at 33 to an operating bar 34 extending transversely of the car body and having handles 35 at its opposite ends to enable pulling of such operating bar from either side of the railway car.

For reasons which hereinafter will become obvious or be made apparent, the control chambers 32 in the valve devices 14 are connected to a control pipe 36 whereby pressurization of such control chamber may be effected for deflection of the respective diaphragms 27 to actuate the respective stems 25 for seating of the respective supply valves 21 and unseating of the respective exhaust valve elements 18 for venting the interior chamber 8 of the respective air springs 5, in lieu of operation of such devices by manipulation of the operator's levers 20. Upon subsequent depressurization of the control chambers 32 in the devices 14 resultant from flow of fluid under pressure therefrom, the respective return springs 30 will effect return of the supply valves 21 to their unseated positions in which they are shown in the drawing, while the bias springs 24 return the respective exhaust valve seat elements 18 to their seated positions in which they are also shown in the drawing.

The coupler apparatus embodying the invention comprises, as shown in plan view in FIGS. 2 and 2a, a male coupler member 37 extending transversely at the wheeled end of "Car 1" for example, and secured to a body member 38 thereof through the medium of a clevis arrangement 39 which permits pivotal movement of the body of "Car 1" at its one end relative to said male coupler member 37 about the vertical axis of a pin 40, while providing for transmission of a pulling force therebetween.

The male coupler member 37 comprises a coupling pin 41 intermediate opposite ends thereof which projects perpendicularly in a horizontal direction from a flat end face 42 extending transversely of said coupler member in a vertical plane.

The coupler apparatus embodying the invention further comprises a female coupler member 43 which is mounted on the dolly wheel end of a car, such as "Car 2," for example, and comprises a coupling pin socket member 44 disposed equidistant from its opposite ends and having a central opening 45 extending inwardly in a horizontal direction from a flat end face 46 of said female coupler member to accommodate the coupling pin 41. A latch member 47 is provided for extension into a slot 48 formed in the coupling pin 41 of the male member 37 to cooperate with a shoulder 49 formed in said coupling pin to tightly lock the male and female coupler members together in the respective positions in which they are shown in the drawing with their respective end faces 42 and 46 an abutting contact one with the other, as will be explained in detail hereinafter.

The cars on which the subject automatic coupler apparatus is utilized usually employ an electro-pneumatic brake equipment with an emergency feature, as well as other electrical equipment, and for this reason counterpart train wire connectors 50 are shown in outline in association with the male and female coupler members 37 and 43, respectively, as also are counterpart train pipe couplers 51 for connecting a straight-air pipe 52 between the cars.

A supervisory air pipe 53 extending through the train is also connected between cars by way of a train pipe coupling 54 associated with the coupling apparatus embodying the invention. Supervisory air pipe 53 is normally charged by means (not shown) during operation of the train, and when becoming devoid of fluid under pressure on any particular car automatically effects by other means (not shown) an emergency application of the brakes, in the well-known manner. On the axle end of any particular car, such supervisory air pipe 53 has a connection via such as a pipe T 55 to the supply pipe 11 to furnish fluid under pressure to the leveling valve devices 9 for regulation of pressure of fluid in the air springs 5.

On the axle end of a car, such as "Car 1," for example, a portion of the straight-air pipe 52 is in the form of a flexible hose 56, while a portion of the supervisory air pipe 53 is in the form of a flexible hose 57. These flexible hoses 56 and 57 permit relative movement between the portions of the straight-air pipe 52 and of the supervisory air pipe 53 during swivel movement of the car body with respect to the male coupler member 37. Also on the axle end of "Car 1," for example, there is provided an angle cock device 58 comprising the usual angle cock (not shown), interposed in the supervisory air pipe 53 between the pipe T 55 and the hose 57, which is positionable rotatably by a lever 59 to open or close the section of the supervisory air pipe 53 connected to the T 55 to the portion connected to the train pipe coupling 54 according to whether or not an arrow 60 on said lever 59 is or is not in alignment with the direction of extension of the said supervisory air pipe. Actuation of the angle cock device 58 to its closed position prior to uncoupling of cars prevents loss of fluid under pressure from the supervisory air pipe 53 on the respective car upon its being uncoupled, to prevent an automatic application of the brakes on such car. Actuation of the lever 59 to effect such closure may be effected from either side of the car by inward movement of an operator's handle 61 or 62 operatively connected at 63 and 64, respectively, to opposite ends of the lever 59. Detent devices 65 carried by the car body cooperate with slots 66 and 67 formed in the operator's handles 61 and 62 to define and lock the angle cock device 58 in its open and closed positions, respectively.

On the dolly wheel end of a car, such as "Car 2," for example, the dolly wheels 3 are spaced apart for cooperation with the rails and secured for rotation about the horizontal axis of respective axles 68 carried on the ends of arms 69 projecting downwardly at opposite sides of the car from a dolly wheel actuating and coupler locking shaft 70 extending transversely therebetween and rotatably supported adjacent its opposite ends by bushings 71 in body members 72 of the respective car.

Gathering pins 73 secured to such body members 72, respectively, cooperate with respective accommodating openings 74 in the male coupler member 37 to properly align such body member 72 on "Car 2" with the male coupler member 37 of "Car 1" when the two cars are coupled together. Corresponding gathering pins 75 adjacent opposite ends of the female coupler member 43, respectively, cooperate with corresponding accommodating openings 75a in the male coupler member 37 for proper alignment between these two members when coupled together.

For sake of illustration, the train pipe coupling 54 associated with the supervisory air pipe 53 may simply comprise a hollow male member 76 in slidably sealed co-operation at its one end with the interior wall of a cylindrical fitting 77 carried by the male coupler member 37, and biased by a spring 78 for sealing cooperation at its opposite end with an annular seat 79 of resilient material carried in a fitting 80 secured to the female coupler member 43. With the two coupler members 37 and 43 coupled together, communication between portions of the supervisory air pipe 53 on the two cars is established by way of central openings in the fittings 77 and 80 and the interior of the hollow cylindrical male member 76. Upon separation of the two coupler members 37 and 43 the hollow cylindrical male member 76 will be retained within the cylindrical fitttng 77 by engagement of an outer portion of said male member with an annular shoulder 81 formed in said fitting. Prior to engagement of the male member 76 with the annular shoulder 81, fluid tight communication through the train pipe coupling 54 will be maintained during separation between the coupler members 37 and 43.

As on "Car 1," "Car 2" is provided with an angle cock device 82 for opening and closing the supervisory air pipe 53 to the train pipe coupling 54 by pushing or pulling on an operator's handle 83 or 84 at one side or the other of the car, respectively, through the medium of a lever 85 operably connected at its opposite ends by pins 86 and 87 to said levers. Detents 88 cooperative with slots 89 and 90 in the operator's handles 83 and 84 define open and closed positions, respectively, of the angle cock device 82, and an arrow 91 marked on the lever 85 defines and indicates open and closed position of the angle cock device according to whether or not the arrow 91 is in alignment with the direction of extension of the supervisory air pipe.

The coupling control apparatus embodying additional features of the invention comprises locking means 92 for the combined dolly wheel actuating and coupler locking shaft 70; unlocking means 93 for unlocking the combined dolly wheel actuating and coupler locking shaft 70; actuating means 94 for actuating the combined dolly wheel actuating and coupler locking shaft 70; dolly wheel position interlock means 95; coupler position interlock means 96; coupler latch retrieving means 97; an inverse double check valve device 98; a shuttle valve device 99; a control pipe coupling 100; and a pair of operator's control valve devices 101 and 102.

Referring to FIGS. 2 and 5, the locking means 92 for the shaft 70 in behalf of simplification is shown in the drawing as same would appear if viewed at right angles to the respective horizontal or plan view of the coupler members 37 and 43. The locking means 92 comprises a rotatable element 103 secured to the shaft 70 and having spaced-apart radial shoulders 105 and 104 for abutting engagement with accommodating shoulders 106 and 107, respectively, formed in retractable lock elements 108 and 109, respectively. The retractable lock elements 108 and 109 are pivotally connected by pins 110 and 111, respectively, to a body member 112 and urged by spring 113 in the direction of the rotatable element 103. A cylindrical surface 114 is formed on the rotatable element 103 which extends circumferentially between the outer edges of the shoulders 105 and 104, to enable one or the other of the elements 108 and 109 to slide therealong when not in engagement with the respective shoulders 104 and 105 or when not otherwise held out of engagement with rotatable element 103 as will be described in detail hereinafter.

The means 93, as will be apparent from subsequent description of operation of the apparatus, serves a dual function in acting as both a means for unlocking the combined dolly wheel actuating and coupler locking shaft 70 as well as in acting as a means for interlocking operation of the actuating means 94 for such shaft. Referring to FIGS. 2 and 3 in the drawings, such means 93 is in the form of cylinder device comprising a casing 115 having formed therein a cylinder wall 116 defining an interior cylinder chamber in which are disposed spaced-apart piston assemblages 117 and 118 which are in slidable sealing engagement with such cylinder wall 116 and are operatively connected to a stem 119 by means of nut 120 in screw-threaded attachment with one end of said piston rod. The stem 119 extends outwardly from one end of the casing 115 in slidably guided cooperation with a bushing 121 and is provided at its outermost end with an integrally formed connector element 122 adapting such stem for operative connection with the retractable lock elements 108 and 109 of the locking means 92. Referring particularly to FIG. 2, the connector element 122 extends between the retractable lock elements 108 and 109 of the locking means 92, with its projecting end normally disposed in engagement with said element 108 and its opposite end intersecting the stem 119 at an annular shoulder 123 normally disposed in contact with said locking element 109.

A removable cylinder head 124 encloses one end of the casing 115 and serves to define an end wall of a pressure chamber 125 within the cylinder wall 116 at one side of the piston assemblage 118. Within the cylinder wall 116, the piston assemblages 117 and 118 serve to define opposite end walls of a pressure chamber 126, and a third pressure chamber 127 within the cylinder wall 116 is defined between piston assemblage 117 and the adjacent end wall of the casing 115.

The cylinder head 124 is provided with a port 128 adapted for connection to a combined control and supply pipe 129 to enable fluid under pressure to be supplied to and released from the pressure chamber 125. A vent port 130 is formed in the casing 115 which constantly opens the chamber 126 to the atmosphere, and a port 131 constantly connected to a pipe 132 opens through the cylinder wall 116 in a location such that the pipe 132 will be open selectively to the chamber 127 in the lowermost positions of the piston assemblages 117 and 118 in which they are shown in FIG. 2, and to the chamber 126 in the uppermost position of said piston assemblages in which they are shown in FIG. 3, for controlling operation of the actuating means 94 as will be described in detail hereinafter.

To enable fluid under pressure to be supplied to the pressure chamber 127 for movement of the piston assemblages 117 and 118 in the direction of the chamber 125, the casing 115 is provided with a port 133 which is in constantly open communication with the chamber 127 and with a pipe 134.

Referring to FIG. 2 in the drawings, the actuating means 94 is in the form of a cylinder device having a hollow cylindrical casing 135 enclosed at opposite ends by end walls 136 and 137. A piston assemblage 138 is slidably disposed for reciprocable movement within the hollow casing 135 and divides the interior thereof into a pressure chamber 139 enclosed by the end wall 137 and a pressure chamber 140 enclosed by the end wall 136.

The piston assemblage 138 is operatively connected to one end of a piston rod 141 extending outwardly of the casing 135 through a central opening in the end wall 136. The end of the piston rod 141 exterior of the casing 135 is pin-connected at 142 to one end of a lever 143, the opposite end of which is secured as by means of a key 144 to the shaft 70 to act as the medium through which said shaft may be caused to turn. As shown in FIG. 2, the lever 143 is viewed at right angles to the view of the shaft 70 as shown in outline in such FIG. 2, and for this reason, at its point of attachment with the lever 143, the shaft 70 is shown in cross section.

To enable the pin-connected end of the lever 143 to be actuated by the piston rod 141 in an arcuate path of travel for rotating the shaft 70, the hollow casing 135 is pivotally connected at 145 to a body member 146 of "Car 2."

Pressure chamber 139 is in constantly open communication with a pipe 147 which in turn is in constantly open communication with a pipe 148 through a section of flexible hose 149 which permits rocking movement of the casing 135 while maintaining fluid tight communication between the chamber 139 and said pipe 148 during operation of the device 94.

Similarly, the chamber 140 is in constantly open communication with the pipe 132 through the medium of a flexible hose 150 and a section of pipe 151.

Referring to FIGS. 2 and 3, the dolly-wheel shaft position interlock means 95 is attached to the means 93, and as shown on the drawing, may share the same casing means 115 therewith. The dolly-wheel shaft position interlock means 95 comprises a stem-type slide valve 152 in slidably guided fluid pressure sealed cooperation at its outer periphery with the inner surface of a sleeve 153 which has press fit in a bore 154 opening into the casing 115.

Slide valve 152 has an annular groove 155 formed in its outer periphery between lands 156 and 157 for establishing fluid pressure communication between a first plurality of radial ports 158 in the sleeve 153 and a second plurality of ports 159 also therein and spaced apart axially of said sleeve from the ports 158.

Each of the ports 158 opens into an annular chamber 160 formed by a recess in the casing 115 in encirclement of the exterior surface of the sleeve 153. Annular chamber 160 is constantly open to atmosphere by way of a vent port 161 opening outwardly through the casing 115 to its exterior surface.

Each of the ports 159 opens into an annular chamber 162 encircling the respective portion of the sleeve 153, and such chamber is constantly open to a port 163 which is connected to a latch retriever control pipe 164.

A bias spring 165 disposed in part in the end portion of the bore 154 cooperates at one end with the casing 115 and extends into the sleeve 153 for cooperation at its opposite end with the slide valve 152 to urge same toward a position defined by engagement of a shoulder 166 therein with a stop element 167 removably secured to the casing, in which position such slide valve is shown in the drawing.

The end of the bore 154 in which the spring 165 is disposed is open to a passage 168 which has a connection with the pipe 148 and is also open via a port 169 through the wall of the bore 116 in means 93 at a location such as to be open to the chamber 125 in the position of piston assemblage 118 in which it is shown in FIG. 3, and to be open to chamber 126 in the lowermost position of said position assemblage in which it is shown in FIG. 2.

For reasons which hereinafter will become apparent, the ports 159 in sleeve 153 are so located as to be open to the interior of the lowermost end of the sleeve 153 in the position in which the slide valve 152 is shown in FIG. 3, and to be open to the annular groove 155 in the alternate position of the slide valve 152 in which it is shown in FIG. 2 and in which said groove also remains open to the ports 158.

To accomplish actuation of the slide valve 152, such slide valve extends outwardly through one end of the bore 154 to the exterior of the casing 115, and, at its outermost end, is provided with a roller follower 170 for engagement with the lowermost surface of the retractable lock element 109, shown in FIG. 2.

The coupler position interlock means 96 (FIGS. 2 and 4) comprises a casing 171 containing an annular valve 172 cooperable with an annular seat 173 to control fluid pressure communication between a chamber 174 and a chamber 175. Valve 172 is provided with an annular insert 176 of resilient material for engagement with the seat 173 and is urged in the direction of such seat by a compression spring 177 disposed in the chamber 174 and interposed between an annular shoulder in the casing 171 and said valve. The annular seat 173 is formed in a reduced end portion of a sleeve element 178 extending from the exterior of the casing 171 into a bore 179 formed therein and being attached to the casing 171 by means such as screw means 180.

Valve 172 is connected to a fluted stem 181 by a nut 182 secured to the threaded end of a pin 183 that extends through aligned central openings in said valve and adjacent end of said fluted stem. The interior of the fluted stem 181 has a hollow cylindrical cavity 184 formed therein which opens at its one end into the chamber 175 and into which a portion of the stem 183 extends. A flange 185 is formed on the pin 183 and is disposed in the cavity 184 in engagement with an annular shoulder 186 at the innermost end of said cavity, whereby the valve 172 is clamped between the lower end of the fluted stem 181 and said nut 182 on the threaded end of said pin 183. The outer periphery of the fluted stem 181 is in slidably guided cooperation with an inner cylindrical wall 187 of the sleeve element 178.

A second sleeve element 188 is disposed in the sleeve element 178 in press fit with the cylindrical wall 187 thereof to remain in a stationary position with respect thereto. A stem 189, in slidably guided cooperation with an inner cylindrical wall 190 of the sleeve element 188, is provided to act as an agent whereby the pin 183 and hence the valve 172 may be unseated.

One end of the stem 189 extends into the chamber 175 and a portion of the outer periphery of such stem is fluted to provide passages 191 for establishing fluid pressure communication between said chamber 175 and a vent port 192 by way of radial ports 193 in said sleeve element and an annular groove 194 formed in sleeve element 178. At the end of the stem 189 which projects into the chamber 175, said stem is provided at its fluted outer periphery with a plurality of stop shoulders 195 for engagement with the lowermost end of the sleeve element 188 to define a repose position of said stem 189, in which position said stem is shown in FIG. 4. In such repose position of stem 189, its opposite end is preferably recessed inwardly of the outer end of the sleeve element 188 to discourage tampering with the means 96 when the female coupler member 43 carrying such device is separated from the male coupler member 37.

A light bias spring 196 is interposed between the flange 185 of pin 183 and the lowermost end of the stem 189 to urge said stem towards its above-mentioned repose position.

A resilient annular sealing ring 197 is carried by the non-fluted portion of the stem 189 for slidable sealing engagement with the inner cylindrical wall 190 of sleeve element 188 to cut off communication between passages 191 and the radial ports 193 in an inwardly depressed position of said stem 189 in which it is shown in FIG. 2.

The chamber 175 is constantly open to the pipe 134 by way of radial ports 198 in sleeve element 178, an annular chamber 199 encircling such ports, and a casing port 200 connected to said pipe 134.

The lowermost end of the chamber 174 is constantly connected to a pipe 201 by way of a casing port 202.

For actuating the stem 189 to effect unseating of the valve 172 of the coupler position interlock means 96, an actuating pin 203 is secured to the male coupler member 37 by means (not shown) to project from the end face 42 thereof into the open end of the sleeve element 188 in the coupled position of members 37 and 43, in which position they are shown in FIG. 2.

Referring to FIG. 2a, the coupler latch retrieving means 97 is shown therein as same would appear if viewed at right angles to the direction of extension of the shaft 70, and such means 97 comprises a hollow cylindrical casing 204 which is secured through the medium of a bracket 205 to the coupling pin socket member 44. A piston assemblage 206 is disposed within the cylindrical casing 204 in slidably guided sealed cooperation with the interior cylinder wall thereof. Piston assemblage 206 is subject opposingly to pressure of fluid in a pressure chamber 207, constantly open to the pipe 164, and to a compression spring 208 disposed in a non-pressure chamber 209 which is constantly open to the atmosphere by way of a vent port 210. The piston rod 211 is operably attached at its one end to the piston assemblage 206 and extends to the exterior of the casing 204 through a central opening in an end wall 212 removably secured to such casing.

According to one novel feature of the invention, a offset crank 70a of the combined dolly-wheel actuating and coupler locking shaft 70 is offset from the axis of the major portion of such shaft so as to travel along an arcuate path (indicated by dot-and-dash line 213) during turning of the shaft 70. The latch member 47 at its one end is rotatably mounted on the offset crank 70a of shaft 70 such that during travel of said crank along the arcuate path 213 the latch member 47 will be carried with it and thereby be advanced either in the direction of the shoulder 49, to cause a pulling force to be exerted on the coupling pin 41, or in the opposite direction and away from the shoulder 49 to a shaft position (indicated by dash line 214) in which such latch member is enabled to be rotated on offset crank 70a laterally out of the slot 48, in which position the coupling pin 41 may be withdrawn.

To provide for effecting such rotary movement of the latch member 47 on the offset crank 70a of the shaft 70, the latch member 47 is integrally attached to one end of a lever arm 215, the opposite end of which is slotted to accommodate a pin 216 extending therethrough and carried by the projecting clevised end of the piston rod 211.

Referring to FIG. 2, the inverse double check valve device 98 comprises a casing 217 in which are disposed a pair of check valves 218 and 219 disposed in chambers 220 and 221, respectively, and attached to opposite ends of a fluted stem 222 which is in slidable cooperation with the wall of a bore 223 extending between said chambers. Formed in the casing 217 at the opposite ends of the bore 223 are respective seats for accommodating the check valves 218 and 219, and intermediate such opposite ends, the casing is provided with a port 224 which constantly opens said bore 223 to the pipe 201. The chambers 220 and 221 in the inverse double check valve device 98 are constantly connected to pipes 225 and 226, respectively.

Referring to FIG. 2a, the shuttle valve device 99 may be in any usual form, but for sake of illustration is shown to comprise a hollow cylindrical casing 227, the interior of which is open at its opposite ends by ports 228 and 229, respectively, which in turn are in constantly open communication with pipes 230 and 231, respectively. Intermediate opposite ends of the casing 227 there is a radial port 232 which is constantly open to the pipe 129, and a piston valve 233, slidably disposed within said hollow casing 227, is arranged to control selective communication between said port 232 and either the port 229 or the port 228 according to the position of said piston valve at one end or the other of casing 227.

Referring to FIG. 2 in the drawings, the control pipe coupling 100 comprises a pair of fitting elements 234 and 235 secured in alignment with male and female coupler members 37 and 43, respectively, each having a central opening extending therethrough which terminates at a port 236 disposed inwardly of the respective coupler members. Each of the fitting elements 234 and 235 includes a hollow sleeve-like sealing member 237 of resilient material removably fit therein to open at one end to the port 236 and to project outwardly of the respective fitting element into the region between the coupler members, for sealing contact at its projecting end with the corresponding part of the counterpart sealing member in the other of said fitting elements.

Referring in particular to the FIG. 6, each of the sealing members 237 is composed of resilient material and comprises a sleeve-like portion 238 having an outer peripheral surface which is provided with a tapered surface 239 at one end to facilitate insertion of such sealing member into the respective fitting element 234 or 235 and an annular recess 240 for accommodating a corresponding annular rib formed in the respective fitting element for locking the sealing member in inserted position. An annular lip portion 241 formed integrally with the sleeve-like portion 238, extends radially inward therefrom as well as in an axial direction therefrom when in its relaxed state.

Referring again to FIG. 2, in the fitting element 234 the port 236 is connected to a pipe 242 which in turn is connected to the control pipe 36 by way of a section of flexible hose 243 which provides for maintaining fluid-tight connection therebetween during relative movement between the coupler member 37 and the body of "Car 1." A choke 244 is disposed in fitting 234 in interposition between the port 236 and the interior of the respective sealing member 237.

Port 236 in the fitting element 235 is in constantly open communication with the pipe 129.

Referring to FIGS. 2 and 2a, each of the operator's control valve devices 101 and 102 comprises a casing 245 having formed therein an inlet chamber 246, control passages 247 and 248, and a vent passage 249. Each of the devices 101 and 102 further comprises a plug valve 250 operable by a handle 251 for, as subsequently will be described in detail, controlling selective communication between the control passages 247 and 248, the inlet chamber 246, and vent passage 249. Each of the devices 101 and 102 is further provided with a choke 252 in constantly open restricted communication with the respective branch of the pipe 53, and a spring-biased check valve 253 cooperable with the end of choke 252 to provide one-way flow communication from the pipe 53 to the chamber 246.

OPERATION

Uncoupling

Referring to FIG. 2 and FIG. 2a on Sheet 1 and Sheet 2, respectively, of the drawings, assume initially that all components of the coupler apparatus are in the respective positions in which they are shown in the drawings, with the respective handles 251 of the operator's control valve devices 101 and 102 being in their respective "Couple" positions; that the supervisory air pipe 53 is charged with fluid under pressure; that the air springs 5 on "Car 1" are pressure inflated; that the two cars are motionless as a result of the brakes having been applied thereon; and that it is desired to effect uncoupling of "Car 1" from "Car 2."

From one side or the other of the train, as preferred by convenience, an operator will turn the handle 251 of either the operator's control valve device 101 or the operator's control valve device 102, according to location of the operator, from the "Couple" position in which it is shown in the drawings to its "Uncouple" position to establish fluid pressure communication between the respective inlet chamber 246 and the respective control passage 248, and between the respective control passage 247 and the respective vent passage 249. The other operator's control valve device 101 or 102 at the opposite side of the train will remain in its "Couple" position in which the respective inlet chamber 246 remains connected via the plug valve 250 to the respective control passage 247 and the respective passage 248 remains connected to the respective vent passage 249.

In the operator's control valve device 101 or 102 with handle in "Uncouple" position, fluid under pressure from the supervisory air pipe 53 will flow through the respective choke 252, and by unseating the respective check valve 253, into the respective inlet chamber 246, thence via the plug valve 250 to the respective passage 248, while the respective passage 247 is vented to the atmosphere by way of said plug valve and the respective vent passage 249. In the operator's control valve device 101 or 102 remaining in its "Couple" position, the respective passage 248 remains vented to atmosphere by way of the respective plug valve 250 and the respective vent passage 249 while the respective passage 247 is supplied with fluid under pressure from the supervisory air pipe 53 by way of the respective choke 252 and the chamber 246 by unseating of the respective check valve 253.

By reference to FIG. 2 and FIG. 2a in the drawings, it will be apparent that by causing one of the operator's control valve devices 101 and 102 to assume its "Uncouple" position while the other of said devices remains in its "Couple" position, one of the pipes 225 and 226 will become pressurized with fluid under pressure via one or the other of the respective passage 247 in these operator's control valve devices while the other of these pipes is vented to the atmosphere, and that one of the pipes 230 and 231 is supplied with fluid under pressure from the supervisory air pipe 53 while the other is vented to atmosphere according to which of the respective passages 248 in said operator's control valve devices are so connected.

With one of the pipes 225 and 226 vented to the atmosphere and the other of said pipes charged with fluid under pressure, the pressurized one of the pipes will cause corresponding pressurization of one or the other of the chambers 220 and 221 in the inverse double check valve device 98 which in turn will cause the check valves 218 and 219 to shift to a position wherein the pipe 201 will be vented to the atmosphere by way of the port 224, the bore 223, the unseated one of said check valves 218 and 219, the respective one of said chambers 220 and 221, and the vented one of said pipes 225 and 226.

With one or the other of the pipes 230 and 231 supplied with fluid under pressure, the piston vlave 233 in the shuttle valve device 99 will be caused to assume a position for establishing communication between the pipe 129 and whichever of said pipes 230 and 231 is pressurized, to supply said pipe 129 with fluid under pressure from the supervisory air pipe 53 via the operator's control valve device 101 or 102 in its "Uncouple" position. Via the pipe 129, fluid under pressure will then flow by way of the control pipe coupling 100, flexible hose 243, and the control pipe 36, to the respective control chambers 32 in the valve devices 14 on "Car 1," and to the pressure chamber 125 in means 93 on "Car 2."

In each of the valve devices 14 on "Car 1" the pressurization of the respective control chamber 32 in acting on the respective diaphragm 27 will actuate the stem 25 against opposition of the return spring 30 to first move the supply valve 21 into seating engagement with the combined supply valve seat and exhaust valve element 18 to close off communication between the conduit means 16 and the delivery pipe 10, and thereafter, while said supply valve remains seated, to actuate the element 18 against opposition of the bias spring 24 to open said conduit means 16 to the atmosphere via chamber 15, slot 22 in said element 18, and the vent passage 23, whereupon fluid under pressure from the bellows chamber 8 of the respective air spring 5 will be released to the atmosphere to permit lowering of the body member 6, hence the body of "Car 1," downwardly into support by respective caged body spring 13. Such lowering of the coupled end of "Car 1" onto the caged body springs 13 in turn is accompanied by a corresponding lowering of the coupled end of "Car 2" inasmuch as such end of "Car 2" is supported by the body of "Car 1" through the medium of the coupler members 37 and 43 thereof, the weight of the axleless end of "Car 2" being transmitted to the axled end of "Car 1" by way of socket member 44, coupling pin 41, clevis assemblage 39, and the body member 38 of "Car 1."

At the same time, pressurization of the chamber 125 in the means 93 in acting on the piston assemblage 118 will cause such piston assemblage as well as the piston assemblage 117 to move in the direction of chamber 127 to assume a position in which it is shown in FIG. 3 for causing the retractable lock element 108 of FIG. 2 and FIG. 5 to move out of locking engagement with the rotatable element 103 to permit rotation of the shaft 70; to open the port 169 to the chamber 125 for communication between the pipe 129 and the passage 168; and to establish communication via port 131 between the pipe 132 and the chamber 126 which is constantly open to the atmosphere by way of the vent port 130. During such operation, the chamber 127 in means 93 will be vented to the atmosphere by way of the pipe 134 and, referring particularly to FIG. 4, in the interlock means 96, the port 200, annular chamber 199, radial ports 198, chamber 175, through the fluted portion of the stem 181 within the cylinder wall 187, the valve 172 which will be unseated and in the position in which it is shown in FIG. 2, the chamber 174, the port 202, the pipe 201, the inverse double check valve device 98, and one of the other of the pipes 225 and 226 according to which of the operator's control valve device 101 or 102 is in its "Uncouple" position.

Referring to FIGS. 2 and 3, in the uppermost position of piston assemblages 117 and 118 in means 93, in which position they are shown in FIG. 3, the chamber 140 in the actuating means 94 is vented to the atmosphere by way of the pipe 131, the flexible hose 150, the pipe 132, chamber 126 and the vent port 130 in said means 93, while fluid under pressure is supplied to the chamber 139 in said actuating means 94 from the pipe 129 by way of the port 128 and the chamber 125 in said means 93, the port 160, the passage 168, the pipe 148, flexible hose 149, and the pipe 147.

In means 94, with its chamber 140 thus vented to the atmosphere and its chamber 139 thus supplied with fluid under pressure, the resultant preponderance in pressure of fluid in said chamber 139 over that in chamber 140 will cause the piston assemblage 138 to move in the direction of chamber 140 and, through the medium of the piston rod 141, the pin 142, lever 143, and key 144, will cause the shaft 70 to turn in its support bushings 71 and, through the medium of arms 69, to effect lowering of the dolly wheels 3 to a lowered position in which they will be, only a fraction of an inch above the rails (not shown) in the air-spring-deflated position of the car body.

Referring to FIG. 2a, during such turning of the shaft 70, the offset crank 70a thereof will move along the arcuate path 213 to its position indicated by the dash line 214 and carry the latch member 47 rotatably mounted thereon in a direction outwardly of the slot 48 and away from the shoulder 49. Such retraction of the latch member 47 away from the shoulder 49 will relax the locking force normally exerted by said latch member on said shoulder, and a slight separation between the end faces 42 and 46 of the male and female coupler members 37 and 43 may result. Such slight separation between members 37 and 43 will be without detriment to operation of the coupler apparatus, however, inasmuch as the train pipe coupler 54 will maintain fluid pressure communication between corresponding respective portions of the supervisory air pipe 53 on "Car 1" and on "Car 2" and the control pipe coupling 100 will maintain fluid pressure communication between the pipe 129 on "Car 1" and the pipe 242 on "Car 2" by extension of the lip portions 241 (shown in FIG. 6) of the resilient sealing members 237 of said coupling 100.

Referring to FIG. 2, FIG. 3, and FIG. 5, also during movement of the shaft 70 to effect lowering of the dolly wheels 3 on "Car 2" as above described, the annular shoulder 123 of connector element 122 will be disposed away from the retractable lock element 109, by virtue of the position of piston assemblages 117 and 118 in means 93, while the retractable lock element 108 is being held out of engagement from rotatable element 103 as same turns with the shaft 70 in a clockwise direction as viewed in FIG. 5. During such turning of the rotatable element 103 with the shaft 70 during lowering of the dolly wheels 3, the retractable lock element 109 will slide along the cylindrical surface 114 as urged thereagainst by the spring 113 until the radical shoulder 105 of said rotatable element 103 comes into alignment with the accommodating shoulder 107 of said lock element 109, whereupon, the spring 113 will cause said lock element 109 to move radially inward of the rotatable element 103 and bring shoulders 105 and 107 into contact one with the other to lock the shaft 70, and hence to lock the dolly wheels 3 in their lowered position.

Referring to FIG. 2 and to FIG. 3, upon movement of the lock element 109 into locking engagement with the rotatable element 103 as above described, the spring 165 of the dolly-wheel position interlock means 95 will cause the roller follower 170 to follow such movement of the lock element 109 and thereby cause the stem-type slide valve 152 to assume the position in which it is shown in FIG. 3 as defined by engagement with stop element 167 and in which position the passage 168 becomes connected to the pipe 164 by way of the respective end of the bore 154, the respective end of the sleeve 153, the ports 159 in said sleeve 153, the annular chamber 162, and the port 163. Also by virtue of such movement of the stem-type slide valve 152 from the position in which it is shown in FIG. 2 to the position in which it is shown in FIG. 3, such pipe 164 becomes blanked off from the vent port 161 by virtue of disestablishment of registry of the annular groove 155 with the ports 159.

Referring to FIG. 2, FIG. 2a and FIG. 3, upon thus establishing communication between the pipe 164 and the passage 168 in interlock means 95, fluid under pressure supplied to the passage 168 from the pipe 129 via the chamber 125 in means 93 as previously described, will then flow from said passage 168 to said pipe 164 and thereby to pressure chamber 207 in the coupler latch retrieving means 97 to cause the piston assemblage 206 therein to move against opposition of the spring 208 in the direction of non-pressure chamber 209 to move the latch member 47 rockably about the offset crank 70a outwardly of the slot 48 in coupling pin 41, through the medium of the piston rod 211, the pin 216, and the lever arm 215 attached to said latch member. Such movement of the latch member 47 to a fully retracted position outside the slot 48 of coupling pin 41 completes the final step in preparation of the coupler apparatus for uncoupling "Car 1" from "Car 2."

Subsequent to retraction of the latch member 47 from the slot 48 in the coupling pin 41, and prior to effecting uncoupling of the two cars, the angle cock device 58 on "Car 1" will be caused to assume its closed position to cut off the section of the supervisory pipe 53 connected to the train pipe coupling 54 from the remainder of said supervisory air pipe extending through the car, by exerting a thrust force on one or the other of operator's handles 61 or 62 until the detent devices 65 engage the respective slots 67 formed in said operator's handles. In the closed position of the angle cock device 58 the arrow 60 will point in the direction at right angles to the direction of extension of the supervisory air pipe 53. At substantially the same time the angle cock device 82 on "Car 2" will also be moved to its closed position to close off the portion of the supervisory air pipe 53 extending through the car to the portion thereof connected to the train pipe coupling 54, by exerting a thrust force on one or the other of the operator's handles 83 or 84 to turn the lever 85 to a position in which the arrow 91 points in a direction at right angles to the direction of extension of the supervisory air pipe and defined by engagement of the detents 88 with respective slots 90 in said handles.

"Car 1" will now be separated from "Car 2" as the male coupler member 37 on "Car 1" is thereby caused to separate from the female coupler member 43 on "Car 2." During such separation of the male and female coupler members 37 and 43 the gathering pins 73 and 75 on "Car 2" will be withdrawn from the openings 74 and 75a, respectively, on "Car 1"; the male member 76 of train pipe coupler 54 under influence of the spring 78 will reach the end of its travel as defined by engagement with the shoulder 81, while the resilient annular seat 79 associated with fitting 80 is carried by the female coupler member 43 away from said member 76, but loss of fluid under pressure from the respective sections of the supervisory air pipe 53 on the two cars at this time is prevented from escape to the atmosphere by the closed angle cock devices 58 and 82; the coupling pin 41 of male coupler member 37 is withdrawn from the coupling pin socket member 44 of female coupling member 43; the sealing members 237 of fitting elements 234 and 235, respectively, carried by the male and female coupler members 37 and 43, respectively, will become parted; and the actuating pin 203 carried by the male coupler member 37 will be withdrawn from engagement with the stem 189 of the coupler position interlock means 96.

Withdrawal of the coupling pin 41 from the coupling pin socket member 44 permits the dolly wheels 3 at the respective end of "Car 2" to drop the required slight distance into engagement with the rails for support of such end of "Car 2" without any appreciable shock.

Separation of the sealing members 237 of the control pipe coupling 100 will vent the control pipe 36 to the atmosphere by way of the flexible hose 243, the pipe 242, the choke 244, and the interior of the respective sealing member 237, while the pipe 129 becomes vented to the atmosphere by way of the port 236 in fitting element 235, and the interior of the respective sealing member 237.

Venting of the control pipe 36 to the atmosphere via the separated control pipe coupling 100 will permit release of fluid under pressure from the respective control chambers 32 in the valve devices 14 on "Car 1" to permit the respective return springs 30 in said devices to return the respective supply valves 21, stems 25 and follower members 26 and 28 to the respective positions in which they are shown in the drawing, and during which the respective elements 18 are returned by the respective springs 24 to their seated positions while the respective supply valves 21 become unseated. In each of the valve devices 14, conduit means 16, hence bellows chamber 8 in the respective air spring 5, is cut off from vent passage 23 and reconnected to the delivery pipe 10 leading from the leveling valve device 9, by way of the passage 19a, the chamber 19, central passage 17 in element 18, and the chamber 15. Repressurization of the bellows chamber 8 in each of the air springs 5 will again result, with consequent raising of the respective end of "Car 1" out of support from the caged body springs 13. Due to the restriction imposed by the choke 244 on such release of fluid under pressure from the control chambers 32 in the devices 14, such operation of these devices as described above will be delayed sufficiently to enable complete withdrawal of the coupling pin 41 from the coupling pin socket member 44 before repressurization of the air springs 5 and consequent raising of the respective end of "Car 1" will occur.

At the same time, the venting of the pipe 129 to the atmosphere at the separated control pipe coupling 100 as previously mentioned, will permit fluid under pressure in the pressure chamber 207 of the coupler latch retrieving means 97 to release to the atmosphere by way of the pipe 164, and, in means 95 as shown in FIG. 3, the port 163, the annular chamber 162, ports 159, the interior of the sleeve element 153, the bore 154, and the passage 168, and in means 93, the port 169, the chamber 125, and port 128, and said pipe 129. Such release of fluid under pressure from the pressure chamber 207 in the latch retrieving means 97, will permit the spring 208 to return the piston assemblage 206 to the position in which it is shown in FIG. 2a and thereby, through the medium of the piston rod 211, pin 216, and lever arm 215, to effect rocking movement of the latch member 47 on shaft portion 70a for projection into the interior of the central opening 45 in the coupling pin socket member 44 in the path of travel of the coupling pin 41 in readiness for recoupling of the two cars.

Also as a result of the venting of the pipe 129 to the atmosphere at the separated control pipe coupling 100, fluid under pressure will be released from the pressure chamber 139 in the actuating means 94 by way of the pipe 147, flexible hose 149, pipe 148, and, in means 95 as shown in FIG. 3, the passage 168, and in means 93 as also shown in FIG. 3, the port 169, the pressure chamber 125 and the port 128 connected to said pipe 129. Such release of fluid under pressure from the pressure chamber 139 in the actuating means 94 at this time will be without effect, and the piston assemblage 138 therein will remain held in its advance position, opposite to that in which it is shown in FIG. 2, by virtue of the position of the shaft 70 being held locked in its dolly-wheel-lowered position by the lock element 109 in locking engagement with the rotatable element 103 secured to offset crank 70a of said shaft 70.

Also by virtue of the venting of the pipe 129 to the atmosphere by way of the separated control pipe coupling 100, fluid under pressure will flow from the pressure chamber 125 in means 93 via the port 128 therein, but such release of fluid under pressure from said pressure chamber 125 at this time will be without effect on position of the piston assemblages 117 and 118, hence position of the connector element 122, since the chamber 127 in said means 93 will remain vented to the atmosphere by way of the pipe 134, and, in the coupler position interlock means 96 positioned as shown in FIG. 4, the casing port 200, the annular chamber 199, radial ports 198 in the sleeve element 178, passages 191 in the stem 189, radial ports 193 in sleeve element 188, annular groove 194, and the vent port 192. The lock element 109 thus will remain in locking engagement with the rotatable element 103 to maintain the shaft 70 locked in its dolly-wheel-lowered position during the time that "Car 2" is uncoupled from "Car 1."

Still further, subsequent to venting of the pipe 129 via the separated control pipe coupling 100, so long as the respective one of the operator's control valve device 101 or 102 remains in its "Uncouple" position there will be some leakage of fluid under pressure from the supervisory air pipe 53 on "Car 2" by way of the respective choke 252, chamber 246, the respective passage 248 in the operator's control valve device 101 or 102 in its "Uncouple" position, pipe 230 or the pipe 231 according to whichever one of said devices is in such position, and the shuttle valve device 99. Such leakage of fluid under pressure from the supervisory air pipe 53 on "Car 2" via the operator's control valve device 101 or 102 in its "Uncouple" position will be limited in amount due to the flow restriction imposed by the respective choke 252 in said operator's control valve device, and such loss of fluid under pressure will be terminated promptly by return of the operator's handle 251 of said operator's control device to its "Couple" position immediately subsequent to separation of "Car 1" from "Car 2," to thereby complete uncoupling operation of the two cars one from the other.

*Coupling*

To effect recoupling between "Car 1" and "Car 2," the hand brakes (not shown) on the car to be coupled will be applied, one or the other of the handles 35 attached to the operating bar 34 on "Car 1" will be pulled to and held in an extended position while the two cars are advanced one in the direction of the other, while the handles of both of the operator's control valve devices 101 and 102 are allowed to remain in their "Couple" positions.

As a result of exerting a pulling force on the operating bar 34 by manipulation of one of the handles 35 on "Car 1," the lever assemblages 20 of both of the valve devices 14 will be rocked to effect depression of the respective stems 29 against opposition of the respective springs 30 and thereby to effect seating of the respective supply valves 21 and unseating of the respective elements 18 to thereby manually effect disestablishment of communication between the leveling valve devices 9 and the air springs 5 and venting of the bellows chambers 8 of such air springs to the atmosphere, as will be understood from previous description of operation of such devices 14 in response to pressurization of their control chambers 32. Venting of the bellows chambers 8 in the air springs 5 will permit lowering of the respective end of "Car 1" onto the caged body springs 13 disposed within said air springs and thereby will effect proper vertical alignment of the coupling pin 41 of the male coupler member 37 on "Car 1" with the coupling pin socket member 44 associated with the female coupler member 43 on "Car 2."

The two cars will then be brought together, as the coupling pin 41 of the male coupler member 37 becomes advanced into the coupling pin socket member 44 of the female coupling member 43; the male member 76 of train pipe coupling 54 engages the resilient annular seat 79 of fitting 80 associated with the female coupler member 43 for fluid-tight communication between respective portions of the supervisory air pipe 53 on the two cars; the complementary members of the control pipe coupling 100 abut to form a fluid-tight communication between the pipe 129 on "Car 2" and the control pipe 36 on "Car 1"; the actuating pin 203 carried by the male coupler 37 enters the open end of sleeve element 188 in the coupler position interlock means 96 to open the valve 172 therein through the medium of stem 189 and pin 183; and the gathering pins 73 and 75 carried by "Car 2" enter the corresponding openings 74 and 75a, respectively, of the male coupling member 37 for proper alignment of components.

During the act of becoming inserted in the coupling pin socket member 44 on "Car 2," the tapered end of the coupling pin 41 on "Car 1" will first engage the interior of such socket member and cause raising of the respective end of "Car 2" to carry the lowered dolly wheels 3 upwardly a slight distance away from the rails as such end of "Car 2" becomes supported through the medium of coupling pin socket member 44 and the coupling pin 41 of the male coupler member 37 by the respective axled end of "Car 1." Also during the act of becoming inserted in the coupling pin socket 44, the tapered end of the coupling pin 41 will first displace the latch member 47 rockably about the offset crank 70a of shaft 70 against opposition of the spring 208 of means 97 through the medium of piston rod 211, pin 216 and lever arm 215, as sliding movement between said coupling pin 41 and the latch member 47 occurs during continued movement of pin 41, until the projecting end of said latch member 47 clears shoulder 49, whereupon the spring 208 will cause said latch member to snap into the slot 48 as shoulder 49 continues to move beyond the projecting end of said latch member until the flat end face 42 of male coupler member 37 comes in contact with the corresponding end face of female coupler member 43.

While contact is maintained between the end faces 42 and 46 of the male and female coupler members 37 and 43, respectively, the angle cock devices 58 and 82 on "Car 1" and "Car 2" are returned to their respective open positions in which they are shown in FIG. 2a of the drawings, by manipulation of either operator's handle 61 or operator's handle 62 on "Car 1" in the case of the angle cock device 58, and by manipulation of the operator's handle 83 or the operator's handle 84 on "Car 2," in the case of the angle cock device 82. Supply of fluid under pressure to the operator's control valve devices 101 and 102 on "Car 2" from the supervisory air pipe 53 as well as communication of fluid under pressure in such supervisory air pipe from one car to the other is thus assured. With both the operator's control valve devices 101 and 102 in their respective "Couple" positions, fluid under pressure in the supervisory air pipe 53 will flow by way of the respective chokes 252 in each of said operator's control valve devices, the respective inlet chambers 246, and the respective passages 247 to pipes 225 and 226, respectively, while the pipes 230 and 231 remain vented to the atmosphere by way of the respective passages 248 and vent ports 249 in said operator's control valve devices.

With supply of fluid under pressure to the pipe 225 and to the pipe 226, fluid under pressure will flow by way of one or the other of said pipes and one or the other of the check valves 218 and 219 in the inverse double check valve device 98 to the pipe 201, thence, in the coupler position interlock means 96, via the port 202, the chamber 174, the unseated valve 172, the fluted portion of the stem 181 within the cylindrical wall 187 of sleeve element 178, the chamber 175, ports 198 in said sleeve element 178, the annular chamber 199, and the port 200 and thence via the pipe 134 to the pressure chamber 127 in means 93.

Since at the time fluid under pressure is thus supplied to the pressure chamber 127 in means 93, the chamber 125 therein is vented to the atmosphere by way of the pipe 129, the shuttle valve device 99 and one or the other of the pipes 230 and 231, such fluid under pressure in chamber 127 will act on the piston assemblage 117 to cause said piston assemblage to move in the direction of chamber 125 to return said assemblage 117 as well as piston assemblage 118 to the position in which they are shown in FIG. 2 as defined by engagement of the piston assemblage 118 with a portion of the casing defining an end wall of said chamber 125. During such movement of the piston assemblages 117 and 118, through the medium of the stem 119 attached thereto, the connector element 122 is retracted away from the lock element 108 and toward the lock element 109, and, through the medium of shoulder 123 in said element 122, said lock element 109 is disengaged from the rotatable element 103 to permit the shaft 70 to be turned reversely for raising the dolly wheels 3 on "Car 2."

At the same time, during such movement of the piston assemblages 117 and 118 in means 93, the passage 168 becomes connected to the chamber 126 and thereby to the atmosphere by way of the vent port 130 so that the chamber 139 in the actuating means 94 also will be so vented by way of the pipe 148, connected to said passage 168, a section of flexible hose 149, and the pipe 147. Such venting of the passage 168, hence pipe 148, by way of the chamber 125 in means 93 however, at this time will be without consequence inasmuch as prior to such movement of the piston assemblages 117 and 118 the passage 168 was already vented to the atmosphere by way of the chamber 125 and the pipe 129 as previously explained.

Also at the time of movement of the piston assemblages 117 and 118 as above-described to unlock element 103 and permit rotation of the shaft 70, the pipe 132 becomes open to the pressure chamber 127, whereupon fluid under pressure from the pipe 134 will flow via said pressure chamber, the pipe 132, the flexible hose 150, and the pipe 151, to the pressure chamber 140 in the actuating means 94 Such pressure of fluid admitted to the pressure chamber 140 in means 94 in acting on the piston assemblage 138 will actuate same in the direction of the vented pressure chamber 139 while effecting turning of the shaft 70 through the medium of the piston rod 141, the pin 142, lever 143 and the key 144 to effect raising of the dolly wheels 3 to a retracted position above the rails. At the same time such turning movement of the shaft 70 will rock the offset crank 70a thereof in a direction in which the latch element 47 is advanced into tight locking engagement with the shoulder 49 in coupling pin 41.

When the shaft 70 as thus turned by the actuating means 94 assumes a position corresponding to fully retracted position of the dolly wheels 3 and of tight lock engagement of the latch member 47 with the shoulder 49 in coupling pin 41, the rotatable element 103 in turning therewith will be caused to assume a position in which its shoulder 104 as shown in FIG. 5 is brought into alignment with the shoulder 106 formed in the lock element 108, whereupon the spring 113 will actuate said element 108 radially inward of rotatable element 103 to bring the shoulders 104 and 106 into locking engagement one with the other to lock said shaft against rotation, hence lock the dolly wheels 3 in their raised position, and hence lock the latch member 47 in tight locking engagement with the shoulder 49 in coupling pin 41 to maintain the male and female coupler members 37 and 43 on the two cars tightly secured one with the other.

It should be pointed out that at the time that the retractable lock element 109 is disengaged from the rotatable element 103 by the means 93 for effecting raising of the dolly wheels 3 as above described, such movement of the retractable lock element 109, through the medium of the follower 170 comprised in means 95 will cause, as will be understood by reference to the showing in FIG. 3, the stem-type slide valve 152 to assume a position in which it is shown in FIG. 2, wherein the pipe 164 hence the chamber 207 in means 97, will be vented to the atmosphere by way of the port 163, annular chamber 162, ports 159 in sleeve 153, the annular groove 155 in said stem-type slide valve 152, ports 158 in said sleeve 153, annular chamber 160, and the vent port 161. Since the chamber 207 in latch retrieving means 97 remains vented to the atmosphere during turning movement of the shaft 70, it will be appreciated that the spring 208 will remain effective to urge the latch member 47 in the direction of slot 48 in coupling pin 41 to enable the above-described advancement of said latch member 47 into tight locking engagement with the shoulder 49 in said coupling pin.

Subsequent to the locking of the shaft 70 and thereby the dolly wheels 3 and the coupling pin 41 as above described, the operating bar 34 on "Car 1" will be released, and this will enable the respective springs 30 in the valve devices 14 to return the components thereof to their respective positions in which they are shown in FIG. 2 and FIG. 2a to reestablish communication as previously traced, between the leveling valve devices 9 and the bellows chamber 8 of the air spring devices 5 for reinflation of same and raising of the coupled end of "Car 1" from support by the caged body springs 13, and, through the medium of the coupled male and female coupler members 37 and 43, also correspondingly raise the coupled end of "Car 2" for support by such air springs on "Car 1."

The coupling of "Car 1" to "Car 2" thus having been completed, the brakes on the newly coupled cars may be released in preparation for movement of the train as including such cars.

Having now described the invention, what I claim as new and desire to secure by Letters Patent is:

1. In a coupler apparatus for a multi-unit articulated vehicle in which coupling means secure an axled end of one vehicle unit into support-transmitting connection with a non-axled end of a second vehicle unit having retractable dolly wheels operable from a raised position to a lowered position for independent support of such non-axled end when said second vehicle unit is separated from said one vehicle unit, the combination of retractable coupler latch means for locking said coupling means, retractable locking means for locking said dolly wheels in their raised position, first fluid pressure operated means for lowering said dolly wheels, second fluid pressure operated means for retracting said retractable locking means to permit lowering of said dolly wheels and to effect supply of fluid under pressure to said first fluid pressure operated means, third fluid pressure operated means for retracting said retractable latch means to free the two vehicle units for separation, interlock means to effect supply of fluid under pressure to said third fluid pressure operated means upon the dolly wheels assuming their lowered position, and operator's control valve means for effecting supply of fluid under pressure to said second fluid pressure operated means.

2. In a coupler apparatus for a multi-unit articulated vehicle in which coupling means secure an axled end of one vehicle unit into support-transmitting connection with a non-axled end of a second vehicle unit having retractable dolly wheels normally disposed in a raised position and actuable through the medium of a rotatable shaft to a lowered position for independent support of such non-axled end when said second vehicle unit is separated from said one vehicle unit, the combination of retractable coupler latch means for locking said coupling means, retractable shaft-locking means for locking said shaft to secure said dolly wheels in their raised position, first fluid pressure operated means for turning said rotatable shaft to lower said dolly wheels, second fluid pressure operated means for retracting said retractable shaft locking means to permit turning of said rotatable shaft and to effect supply of fluid under pressure to said first fluid pressure operated means, third fluid pressure operated means for retracting said retractable latch means to unlock said coupling means, interlock means controlled by rotatable shaft position to effect supply of fluid under pressure to said third fluid pressure operated means upon the dolly wheels assuming their lowered position, and operator's control valve means for effecting supply of fluid under pressure to said second fluid pressure operated means.

3. In a coupler apparatus for a multi-unit articulated vehicle in which coupling means secure an axled end of one vehicle unit into support-transmitting connection with a non-axled end of a second vehicle unit having retractable dolly wheels normally disposed in a raised position and actuable through the medium of a rotatable shaft to a lowered position for independent support of such non-axled end when said second vehicle unit is separated from said one vehicle unit, the combination of retractable coupler latch means for locking said coupling means, shaft means including a first retractable lock element normally positioned for locking said rotatable shaft in a position in which said dolly wheels are raised and capable of being actuated to an unlocked position to free said rotatable shaft for turning movement and including a second rectractable lock element normally disposed in an ineffective position and biased to assume a locked position for locking said rotatable shaft means in a position in which said dolly wheels are fully lowered upon said rotatable shaft having assumed such position, first fluid pressure operated means responsive to pressurization of a respective pressure chamber for turning said rotatable shaft to lower said dolly wheels, a control conduit supplied with fluid under pressure at the discretion of an operator, second fluid pressure operated means responsive to pressurization of said control conduit to actuate said first retractable lock element to its said unlocked position and to establish fluid pressure communication between said control conduit and the pressure chamber respective to said first fluid pressure operated means, third fluid pressure operated means responsive to pressurization of a respective pressure chamber for actuating said retractable latch means to unlock said coupling means, and interlock means for establishing fluid pressure communication between said control conduit and the pressure chamber respective to said third fluid pressure operated means.

4. In a coupler apparatus for a multi-unit articulated railway vehicle comprising one vehicle unit having normally pressurized air springs supporting an axled end of the body of such unit, having caged mechanical spring assemblages onto which the axled end of the body of such unit will lower for support upon depressurization of said air springs, and having a coupling pin secured to the axled end of the body of such unit and projecting horizontally therefrom, said vehicle also comprising a second vehicle unit having at a non-axled end thereof a coupling pin socket member normally locked in support-transmitting connection with the said coupling pin of said one vehicle unit and having normally retracted dolly wheels capable of being lowered into a position which will be in close proximity to the rails when the two vehicle units are coupled and the air springs on said one vehicle unit are deflated, the combination of fluid pressure operated valve means for location on said one vehicle unit and operative upon the supply of fluid under pressure thereto to effect depressurization of the air springs thereon, separable pipe coupling means for conveying fluid under pressure from the said second vehicle unit to said fluid pressure operated valve means on said one vehicle unit while the two vehicle units are coupled together, fluid pressure actuator means for location on said second vehicle unit and operative upon the supply of fluid under pressure thereto to effect unlocking of the said coupling pin from the said coupling pin socket member and to effect lowering of the said dolly wheels, and operator's control valve means for location on said second vehicle unit and operative to effect supply of fluid under pressure to said fluid pressure operated valve means via said pipe coupling means and to said fluid pressure actuator means.

5. In a coupler apparatus for a multi-unit articulated vehicle in which an axled end of one vehicle unit has a coupler member adapted to be locked into support-transmitting coupling with a complementary coupler member on the non-axled end of a second vehicle unit having retractable dolly wheels which are locked in a lowered position for independent support of such non-axled end when the two vehicle units are separated, in combination, fluid pressure operated means for unlocking the said dolly wheels, fluid pressure power means for raising the said dolly wheels and tightly locking the two coupler members together, operator's control valve means to effect supply of fluid under pressure to the two fluid pressure means, first interlock means preventing such supply of fluid under pressure to either of the two fluid pressure means while the two coupler members are parted, and operable upon reunion of the two coupler members to permit supply of fluid under pressure to said fluid pressure operated means, and second interlock means preventing supply of fluid under pressure to said fluid pressure power means while the said dolly wheels are locked in their lowered position and permitting such supply after unlocking of the said dolly wheels has been accomplished.

6. In a coupler apparatus for a multi-unit articulated railway vehicle comprising one vehicle unit having normally pressurized air springs supporting an axled end of the body of such unit, having caged mechanical spring assemblages onto which the axled end of the body of such unit will lower for support upon depressurization of said air springs, and having a coupling pin secured to the axled end of the body of such unit and projecting horizontally therefrom, said vehicle also comprising a second vehicle unit having at a non-axled end thereof a coupling pin socket adapted to receive said coupling pin in support-transmitting coupling engagement therewith, and having normally retracted dolly wheels which occupy a lowered position for independent support of such non-axled end at a height in which the coupling pin socket thereon will be disposed in alignment vertically with the coupling pin on the said one vehicle unit, while the two vehicle units are separated, in combination, manually operable control valve means for location on said one vehicle unit to effect depressurization of the air springs thereon, fluid pressure power means for location on said second vehicle unit to effect retraction of said dolly wheels, operator's control valve means for location on said second vehicle unit to effect supply of fluid under pressure to said fluid pressure power means, and interlock means to prevent such supply of fluid under pressure to said fluid pressure power means until said coupling pin socket member has received said coupling pin.

7. In a coupler apparatus for a multi-unit articulated railway vehicle comprising one vehicle unit having normally pressurized air springs supporting an axled end of the body of such unit, having caged mechanical spring assemblages onto which the axled end of the body of such unit will lower for support upon depressurization of said air springs, and having a coupling pin secured to the axled end of the body of such unit and projecting horizontally therefrom, said vehicle also comprising a second vehicle unit having at a non-axled end thereof a coupling pin socket adapted to receive said coupling pin in support-transmitting coupling engagement therewith, and having normally retracted dolly wheels which occupy a lowered position for independent support of such non-axled end at a height in which the coupling pin socket thereon will be disposed in alignment vertically with the coupling pin on the said one vehicle unit, while the two vehicle units are separated, in combination, a combined fluid pressure operable and manually operable vent valve means for location on said one vehicle unit to effect depressurization of the air springs thereon, fluid pressure power means for location on said second vehicle unit to effect retraction and lowering of said dolly wheels, hose pipe coupling means for conveying fluid under pressure from said second vehicle unit to said one vehicle unit for operating said vent valve means thereon during uncoupling, and operator's control valve means to effect supply of fluid under pressure to said power means at the exclusion of said hose pipe coupling means during coupling of the two vehicle units and to both said power means and to said hose pipe coupling means during uncoupling of the two vehicle units.

8. An automatic coupler system forming a part of a vehicle end structure including a coupling pin receiving recess having associated therewith a latch assembly including a movable pin engaging latch element positionable within said recess, said latch element being eccentrically mounted on a shaft which is rotatable and which carries a wheel for retractable movement into and out of vehicle end structure supporting position, fluid operated means engaged with said shaft for rotating the same and moving said latch element into and out of clamping engagement with said pin, fluid pressure supply means connected with said fluid operated means, and fluid pressure control means forming a part of said fluid pressure supply means, said fluid pressure control means including venting means operable only upon completion of movement of said wheel into vehicle end structure supporting position and movement of said latch element out of clamping engagement with said pin whereby said latch element is at least partially held in clamping engagement with said pin by the fluid pressure of said supply means.

9. In a coupler system interconnecting adjacent ends of a first vehicle with a second vehicle wherein said first vehicle carries a male coupling member provided with an outwardly projecting pin which is received within a recess formed in a female coupling member carried by said second vehicle, and the adjacent end of said second vehicle is provided with a retractable dolly wheel vehicle supporting structure including a transverse rotatable shaft, the provision of a pin engaging latch assembly forming a part of said female coupling member and including a movable latch element positioned within said recess in locking engagement with said pin, said latch element being eccentrically mounted on said shaft to move out of locking engagement with said pin upon rotation of said shaft to move said dolly wheel into vehicle supporting position, first fluid pressure operated means connected to said latch element to move the same clear of said pin in response to fluid pressure to allow separation of said vehicles, second fluid pressure operated means engaged with said shaft for rotating the same, a shaft engaging lock assembly mechanically holding said shaft in dolly wheel inoperative position while being further arranged to hold said shaft in dolly wheel vehicle supporting position upon rotation of said shaft, third fluid pressure operated means connected to said shaft engaging lock assembly to disengage the same for rotation of said shaft, fluid pressure supply means connected with said fluid pressure operated means, and fluid pressure control means forming a part of said supply means and said pressure operated means, said control means including venting means which are closed in the fully coupled condition of said vehicle, said second fluid pressure operated means being open to said fluid pressure supply means in the fully coupled condition of said vehicles to apply torque to said shaft and aid in holding said vehicles together through the locking engagement of said latch element with said pin.

10. Coupled vehicle end structures wherein a first end structure is supported by a fluid pressurized spring suspension system mounted on a wheel carrying axle and a second end structure is coupler supported by said first end structure through a mated coupling system, said coupling system including male and female coupling members, the female coupling member having a recess receiving a male pin therein, a pin locking latch assembly forming a part of said female coupling member and being mounted on a transverse rotatable shaft carrying retractable dolly wheels for supporting said second end structure in its uncoupled condition, fluid pressure operated means attached to said latch assembly and shaft to operate the same during coupling and uncoupling of said end structures, fluid pressure supply means communicating with said pressure operated means and said fluid pressurized spring suspension system, and fluid pressure supply control means directing fluid pressure to said pressure operated means and fluid pressurized spring suspension system in a predetermined operational sequence during coupling and uncoupling of said end structures, said fluid pressure supply control means including a valve means operable in initiating the uncoupling operational sequence, said valve means upon initiation of the uncoupling operational sequence placing a control fluid pressure in communication with a control valve forming a part of said fluid pressurized spring suspension system, said control valve including a vent which upon actuation of said control valve by said control fluid pressure delivered through said valve means is placed in communication with the fluid pressurized springs of said suspension system to deflate said springs.

11. Coupled vehicle end structures wherein a first end structure is supported by a fluid pressurized spring suspension system mounted on a wheel carrying axle and a second end structure is coupler supported by said first end structure through a mated coupling system, said coupling system including male and female coupling members, the female coupling member having a recess receiving a male pin therein, a pin locking latch assembly forming a part of said female coupling member and being mounted on a transverse rotatable shaft carrying retractable dolly wheels for supporting said second end structure in its uncoupled condition, mechanical locking means engaging said shaft to control positioning of said dolly wheels, fluid pressure operated means attached to said latch assembly, shaft and locking means to operate the same during coupling and uncoupling of said end structures, fluid pressure supply means communicating with said pressure operated means and said fluid pressurized spring suspension system, and fluid pressure supply control means directing fluid pressure to said pressure operated means and fluid pressurized spring suspension system in a predetermined operational sequence during coupling and uncoupling of said end structures, said fluid pressure supply control means including a valve means operable in initiating the uncoupling operational sequence, said valve means upon initiation of the uncoupling operational sequence placing a control fluid pressure in communication with a control valve forming a part of said fluid pressurized spring suspension system, said control valve include a vent which upon actuation of said control valve by said control fluid pressure delivered through said valve means is placed in communication with the fluid pressurized springs of said suspension system to deflate said springs.

12. In a coupler apparatus for a multi-unit articulated vehicle of the type having coupling means for normally supportably securing, to an axled end of one vehicle unit, a non-axled end of another vehicle unit that is provided with retractable dolly wheels capable while lowered to independently support such non-axled end when the units are separated, the combination of latch means for normally locking the coupling means in a coupling position, locking means for normally locking the dolly wheels in a raised position, double-acting actuating means provided on the aforementioned other vehicle unit and controlled by opposing fluid pressures in two chambers for controlling raising and lowering of the dolly wheels and responsive to selective charging of one or the other of said chambers while such other or one chamber is vented to raise or lower the dolly wheels, respectively, unlocking means operable by fluid under pressure for unlocking said locking means to permit lowering of the dolly wheels, fluid pressure operated means for admitting fluid under pressure to said other chamber and venting said one chamber, operator's control valve means for controlling supply of fluid under pressure to said unlocking means and fluid pressure operated means, latch retrieving means operable by fluid under pressure for disengaging said latch means from the coupling means to free the vehicle units for separation, and interlock means controlled by position of the dolly wheels and operative to effect supply of fluid under pressure to said latch retrieving means only when the dolly wheels are in a lowered position.

13. In a coupler apparatus for a multi-unit articulated vehicle in which coupling means secures an axled end of one vehicle unit into support-transmitting connection with a non-axled end of a second vehicle unit having retractable support means operable from a raised position to a lowered position for independent support of such non-axled end when the second vehicle unit is separated from the one vehicle unit, the combination of retractable coupler latch means for locking the coupling means, holding means for retaining the support means in raised position in the coupled condition of the vehicle units, first fluid pressure operated means for lowering the support means, second fluid pressure operated means for releasing said holding means to permit movement of the support means to lowered position, third fluid pressure operated means for retracting said retractable latch means to free the two vehicle units for separation, operator's control valve means for effecting supply of fluid under pressure to each of said fluid pressure operated means, and means to delay supply of operating fluid under pressure to said first fluid pressure operated means until after said second fluid pressure operated means has operated to release said holding means.

14. In a coupler apparatus for a multi-unit articulated vehicle in which coupling means secures an axled end of one vehicle unit into support-transmitting connection with a non-axled end of a second vehicle unit having retractable support means operable from a raised position to a lowered position for independent support of such non-axled end when the second vehicle unit is separated from the one vehicle unit, the combination of retractable coupler latch means for locking the coupling means, holding means for retaining the support means in raised position in the coupled condition of the vehicle units, first fluid pressure operated means for lowering the support means, second fluid pressure operated means for releasing said holding means to permit movement of the support means to lowered position, third fluid pressure operated means for retracting said retractable latch means to free the two vehicle units for separation, operator's control valve means for effecting supply of fluid under pressure to each of said fluid pressure operated means, means to delay supply of operating fluid under pressure to said first fluid pressure operated means until after said second fluid pressure operated means has operated to release said holding means, and means to delay supply of operating fluid under pressure to said third fluid pressure operated means until the support means has assumed its lowered position.

15. In a coupler system interconnecting adjacent ends of a first vehicle with a second vehicle wherein said first vehicle carries a male coupling member provided with an outwardly projecting pin which is received within a recess formed in a female coupling member carried by said second vehicle, and the adjacent end of said second vehicle is provided with a retractable dolly wheel vehicle supporting structure including a transverse rotatable shaft, the provision of a pin engaging latch assembly forming a part of said female coupling member and including a movable latch element positioned within said recess in locking engagement with said pin, said latch element being eccentrically mounted on said shaft to move out of locking engagement with said pin into safety lock position upon rotation of said shaft to move said dolly wheel into vehicle supporting position, the safety lock position placing said latch element in position to clear said pin while preventing inadvertent separation of said vehicles, first fluid pressure operated means connected to said latch element to move the same clear of said pin in response to fluid pressure to allow separation of said vehicles, said first fluid pressure operated means including resilient means urging said latch element into safety lock position, second fluid pressure operated means engaged with said shaft for rotating the same, a shaft engaging lock assembly mechanically holding said shaft in dolly wheel inoperative position while being further arranged to hold said shaft in dolly wheel vehicle supporting position upon rotation of said shaft, third fluid pressure operated means connected to said shaft engaging lock assembly to disengage the same for rotation of said shaft, fluid pressure supply means connected with said fluid pressure operated means, and fluid pressure control means forming a part of said supply means and said pressure operated means, said control means including venting means which are closed in the fully coupled condition of said vehicles, said second fluid pressure operated means being open to said fluid pressure supply means in the fully coupled condition of said vehicles to apply torque to said shaft and aid in holding said vehicles together through the locking engagement of said latch element with said pin.

16. In a coupler system interconnecting adjacent ends of a first vehicle with a second vehicle wherein said first vehicle carries a male coupling member provided with a transverse face plate and an outwardly projecting pin which is received within a recess formed in a female coupling member carried by said second vehicle, said female coupling member having a face plate juxtapositioned to the face plate of said male coupling member, and the adjacent end of said second vehicle is provided with a retractable dolly wheel vehicle supporting structure including a transverse rotatable shaft, the provision of a pin engaging latch assembly forming a part of said female coupling member and including a movable latch element positioned within said recess in locking engagement with said pin, said latch element being eccentrically mounted on said shaft to move out of locking engagement with said pin upon rotation of said shaft to move said dolly wheel into vehicle supporting position, first fluid pressure operated means connected to said latch element to move the same clear of said pin in response to fluid pressure to allow separation of said vehicles, second fluid pressure operated means engaged with said shaft for rotating the same, a shaft engaging lock assembly mechanically holding said shaft in dolly wheel inoperative position while being further arranged to hold said shaft in dolly wheel vehicle supporting position upon rotation of said shaft, third fluid pressure operated means connected to said shaft engaging lock assembly to disengage the same for rotation of said shaft, fluid pressure supply means connected with said fluid pressure operated means, and fluid pressure control means forming a part of said supply means and said pressure operated means, said control means including venting means carried by each of said face plates which venting means are closed in the fully coupled condition of said vehicles, said second fluid pressure operated means being opened to said fluid pressure supply means in the fully coupled condition of said vehicles to apply torque to said shaft and aid in holding said face plates together through the locking engagement of said latch element with said pin.

17. In a coupler system interconnecting adjacent ends of a first vehicle with a second vehicle wherein said first vehicle carries a male coupling member provided with a transverse face plate and an outwardly projecting pin which is received within a recess formed in a female coupling member carrier by said second vehicle, said female coupling member having a face plate juxtapositioned to the face plate of said male coupling member, and the adjacent end of said second vehicle is provided with a retractable dolly wheel vehicle supporting structure including a transverse rotatable shaft, the provision of a pin engaging latch assembly forming a part of said female coupling member and including a movable latch element positioned within said recess in locking engagement with said pin, said latch element being eccentrically mounted on said shaft to move out of locking engagement with said pin into safety lock position upon rotation of said shaft to move said dolly wheel into vehicle supporting position, the safety lock position placing said latch element in position to clear said pin while preventing inadvertent separation of said vehicles, first fluid pressure operated means connected to said latch element to move the same clear of said pin in response to fluid pressure to allow separation of said vehicles, said first fluid pressure operated means including resilient means urging said latch element into safety lock position, second fluid pressure operated means engaged with said shaft for rotating the same, a shaft engaging lock assembly mechanically holding said shaft in dolly wheel inoperative position while being further arranged to hold said shaft in dolly wheel vehicle supporting position upon rotation of said shaft, third fluid pressure operated means connected to said shaft engaging lock assembly to disengage the same for rotation of said shaft, fluid pressure supply means connected with said fluid pressure operated means, and fluid pressure control means forming a part of said supply means and said pressure operated means, said control means including venting means carried by each of said face plates which venting means are closed in the fully coupled condition of said vehicles, said second fluid pressure operated means being opened to said fluid pressure supply means in the fully coupled condition of said vehicles to apply torque to said shaft and aid in holding said face plates together through the locking arrangement of said latch element with said pin.

18. In a coupler system interconnecting adjacent ends of a first vehicle with a second vehicle wherein said first vehicle carries a male coupling member provided with a transverse face plate and an outwardly projecting pin which is received within a recess formed in a female coupling member carried by said second vehicle, said female coupling member having a face plate juxtapositioned to the face plate of said male coupling member, and the adjacent end of said second vehicle is provided with a retractable dolly wheel vehicle supporting structure including a transverse rotatable shaft, the provision of a pin engaging latch assembly forming a part of said female coupling member and including a movable latch element positioned within said recess in locking engagement with said pin, said latch element being eccentrically mounted on said shaft to move out of locking engagement with said pin upon rotation of said shaft to move said dolly wheel into vehicle supporting position, first fluid pressure operated means connected to said latch element to move the same clear of said pin in response to fluid pressure to allow separation of said vehicles, second fluid pressure operated means engaged with said shaft for rotating the same, a shaft engaging lock assembly mechanically holding said shaft in dolly wheel inoperative position while being further arranged to hold said shaft in dolly wheel vehicle supporting position upon rotation of said shaft, third fluid pressure operated means connected to said shaft engaging lock assembly to disengage the same for rotation of said shaft, valve means carried by said female coupling member and housed relative to an opening in the face plate thereof to close the opening in the uncoupled condition of said female coupler, valve opening means carried by the face plate of said male coupling member projecting therefrom and into said opening into depressing contact with said valve means, fluid pressure supply means connected with said fluid pressure operated means and valve means, and fluid pressure control means forming a part of said supply means and said pressure operated means, said control means including venting means carried by each of said face plates which venting means are closed in the fully coupled condition of said vehicles, said valve means in its depressed position exposing a portion of said third fluid pressure operated means to fluid pressure to disengage said lock assembly to allow rotation of said shaft into dolly wheel inoperative position when coupling said vehicles, said second fluid pressure operated means being opened to said fluid pressure supply means in the fully coupled condition of said vehicles to apply torque to said shaft and aid in holding said face plates together through the locking engagement of said latch element with said pin.

19. The coupled vehicle end structures of claim 11 wherein the mechanical locking means engaging said shaft comprises oppositely positioned locking fingers each having a projecting locking surface for engagement with a recess in said shaft, said fingers being spring urged against said shaft for alternate locking of said shaft with its dolly wheels in a raised and lowered position.

20. The coupled vehicle end structures of claim 11 wherein sadi latch assembly is provided with a latch element pivotally mounted on an eccentric portion of said shaft for movement thereby into and out of a first and second locking position relative to said pin, said first position placing said latch element in a locking recess in said pin relative to the inner surface thereof to allow movement of said latch element free of said pin while providing for pin locking abutment with said inner surface upon partial withdrawal of said pin from the recess of said female coupling member, said second position placing said latch element in tight pin locking engagement with the inner surface of said locking recess, and the latch assembly being further attached to a fluid pressure actuated piston constituting the fluid operated means thereof, said piston being spring mounted to urge said latch element into its first position and being movable against its spring in response to fluid pressure to pivot said latch element about said shaft into a third position completely clearing said latch element from register with said locking recess.

21. The coupled vehicle end structures of claim 19 wherein the fluid operated means attached to said locking means includes a double acting fluid actuated piston in engagement with said fingers to alternately release the same from locking engagement with said shaft, said double acting piston being housed in a cylinder having communicating with the interior thereof at spaced points a pair of conduits which in turn communicate to opposite sides of a further double acting piston constituting the fluid pressure operated means attached to said shaft, the position of the first named piston relative to said points controlling the transmitting of fluid to said further piston following completed unlocking of said shaft.

22. The coupled vehicle end structures of claim 21 wherein said latch assembly is provided with a latch element pivotally mounted on an eccentric portion of said shaft for movement thereby into and out of a first and second locking position relative to said pin, said first position placing said latch element in a locking recess in said pin relative to the inner surface thereof to allow movement of said latch element free of said pin while providing for pin locking abutment with said inner surface upon partial withdrawal of said pin from the recess of said female coupling member, said second position placing said latch element in tight pin locking engagement with the inner surface of said locking recess, and the latch assembly being further actuated through a fluid pressure actuated piston constituting the fluid operated means thereof, said piston being spring mounted to urge said latch element into its first position and being movable against its spring in response to fluid pressure to pivot said latch element about said shaft into a third position completely clearing said latch element from register with said locking recess.

References Cited in the file of this patent

UNITED STATES PATENTS

| | | |
|---|---|---|
| 2,358,625 | Cameron | Sept. 19, 1944 |
| 2,363,851 | Barnhart et al. | Nov. 28, 1944 |
| 2,374,320 | Barnhart et al. | Apr. 24, 1945 |
| 2,664,299 | Fitch | Dec. 29, 1953 |